United States Patent Office.

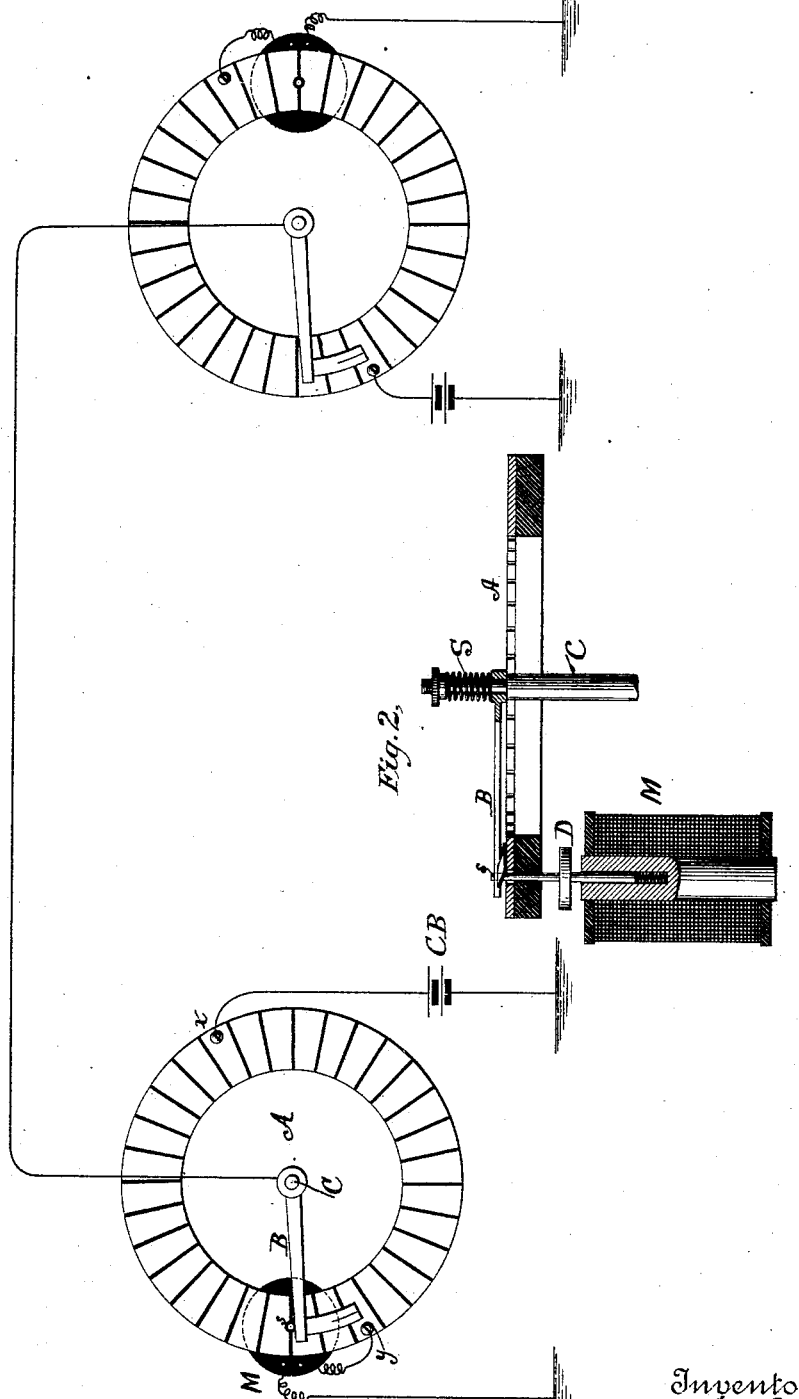

HENRY C. BRIDGER, OF NEW YORK, N. Y., ASSIGNOR TO JOSIAH QUINCY AND A. L. PARCELLE, BOTH OF BOSTON, MASSACHUSETTS.

ELECTRICAL SYNCHRONOUS MOVEMENT.

SPECIFICATION forming part of Letters Patent No. 375,727, dated January 3, 1888.

Application filed February 15, 1886. Renewed July 9, 1887. Serial No. 243,899. (No model.)

*To all whom it may concern:*

Be it known that I, HENRY C. BRIDGER, a subject of the Queen of Great Britain, residing in New York city, State of New York, have invented an Improvement in Electrical Synchronous Movements, of which the following is a specification.

My invention relates to that class of instruments in which synchronously-rotated trailing fingers or circuit-completers are caused to rotate concentrically over circular series of insulated contacts—as, for instance, in printing-telegraphy and synchronous multiplex telegraphy. As an example of the latter system of telegraphy, reference is made to the patent of Albert L. Parcelle, No. 324,153, granted August 11, 1885. In order to insure the proper synchronous rotation of such rotating circuit-completers, it is necessary that they should be subjected to slight corrections to maintain them in proper synchronous relation.

My invention consists in connecting the rotating circuit-completer with its driving mechanism by means of a frictional or yielding connection, so that when the rotator is checked or acted upon to bring it into synchronism the driven part of the instrument or the motor, whatever may be its character, whether electrical or mechanical, will not be materially affected. The running of the instruments will therefore be steady, accurate, and uniform.

In the accompanying drawings I have illustrated an organization by which synchronous multiplex telegraphy may be practiced in the manner set forth in the patent of Parcelle, above mentioned.

Figure 1 is a diagram of two terminal stations connected by a main line, and Fig. 2 is a detail sectional view of such parts of an instrument as are necessary to illustrate the invention.

At each end of the line is shown a table, A, of insulated contacts, over which a rotating arm or circuit-completer, B, travels, the arm being carried by a spindle, C, which may be driven by any suitable electrical or mechanical motor. As is well understood, when the circuit-completers are running in unison, they rest on corresponding contacts at the same time, and this fact may be availed of for multiplex telegraphic transmission or other purposes. At each station one of the contacts, $x$, is shown as connected with a battery, C B, while the corresponding contacts, $y$, at the opposite stations are connected to earth through the coils of magnets M. These magnets are provided with any suitable forms of armatures, D, which control detents or stops $s$, that project into the paths of the rotating circuit-completers or devices. The rotating circuit-completers B, upon which the controlling electrical impulses act, are connected with the driven parts of the apparatus or motors by yielding or frictional connections.

The specific arrangement shown in the drawings is as follows: The spindle is formed with a shoulder or collar, against which the rotator, which is carried on the spindle, rests, the two parts being held in frictional contact by a spring, S, surrounding the end of the spindle. The pressure of the spring is adjusted by a screw-nut on the end of the spindle. If the instruments at both stations are running, and one of them travels faster than the other, it will be checked by its detent and held while its motor runs on undisturbed. In this position the finger of the rotator will rest on the magnet-contact $y$. When the other rotator comes into a corresponding position, it will make contact with its battery-contact. A current will therefore be transmitted over the line, the magnet energized, and the detent removed, so that both circuit completers will travel in unison.

The invention may be used in connection with any system of electrical correction or control.

I claim as my invention—

1. In an electrical synchronous movement or system, the combination of the circular series of insulated contacts, a rotating circuit-completer which traverses the circle of contacts, mechanism for correcting or controlling said circuit-completer, operated by correcting or controlling electrical impulses, and a yielding or frictional connection between the rotating circuit-completer and its driving mechanism.

2. The combination of a main line, a driven instrument at each end of the line, a rotator or circuit-completer connected with one instrument, a rotator or circuit-completer connected with the other instrument by a frictional connection, a device or detent for checking such rotator when it travels too fast, and means for transmitting an impulse of electricity over the line to remove said checking device when the rotators come into corresponding positions.

3. The combination, substantially as set forth, of a line, synchronously-rotated instruments connected in the line, one at least of said instruments having its rotating portion connected with its driving mechanism by means of a frictional connection, and means whereby regularly-recurring synchronizing impulses may be automatically sent over the line to correct the position of said frictionally-rotated portion of said instrument.

4. The combination of a main line, and at each end thereof a circular series of insulated contacts, a rotating circuit-completer which traverses the circle of contacts, and a frictional connection between the rotating circuit-completer and its driving mechanism, a correcting-battery connected with one of the contacts at one station and electro-magnetic correcting devices at the other station which act upon the rotator at that station to correct its position relatively to the rotator at the distant station.

5. The combination, substantially as set forth, of a main line, at each end thereof a circular series of insulated contacts, a rotating circuit-completer, and a frictional connection between the rotating circuit-completer and its driving mechanism, a correcting-battery connected with a contact at each station, a correcting electro-magnet or coil at each station connected with a contact corresponding in position to the battery-connected contact at the other station, and devices controlled by said electro-magnet to correct the rotator, whereby synchronizing or correcting impulses may be sent from either station to act upon the frictionally-driven rotator at the other station.

6. The combination of the circular series of insulated contacts, the rotating spindle arranged concentrically in said circle, the trailer carried upon the spindle, the frictional connection between the trailer and spindle, the correcting-magnet M, its armature, and the detent $s$, which acts upon the trailer, substantially as set forth.

In testimony whereof I have hereunto set my hand this 28th day of January, A. D. 1886.

HENRY C. BRIDGER.

Witnesses:
E. C. DAVIDSON,
A. A. CAULDWELL.